United States Patent [19]

Yamamoto et al.

[11] Patent Number: 5,713,809
[45] Date of Patent: Feb. 3, 1998

[54] CHAIN TENSIONER AND CHAIN SYSTEM

[75] Inventors: Ken Yamamoto, Iwata; Katsuhisa Suzuki, Hamamatsu; Kazuki Kawashima; Tsuyoshi Niwa, both of Iwata, all of Japan

[73] Assignee: NTN Corporation, Osaka, Japan

[21] Appl. No.: 806,624

[22] Filed: Feb. 26, 1997

[30] Foreign Application Priority Data

| | | |
|---|---|---|
| Feb. 27, 1996 | [JP] Japan | 8-039251 |
| Mar. 29, 1996 | [JP] Japan | 8-075818 |
| Jun. 11, 1996 | [JP] Japan | 8-148998 |
| Jun. 27, 1996 | [JP] Japan | 8-167551 |
| Jul. 3, 1996 | [JP] Japan | 8-173492 |
| Sep. 3, 1996 | [JP] Japan | 8-232848 |
| Sep. 3, 1996 | [JP] Japan | 8-232954 |
| Nov. 22, 1996 | [JP] Japan | 8-312103 |

[51] Int. Cl.$^6$ .................................................. F16H 7/08
[52] U.S. Cl. ........................... 474/110; 474/135; 474/138
[58] Field of Search ............................ 474/101, 110, 474/111, 133, 135, 138

[56] References Cited

U.S. PATENT DOCUMENTS

| | | | |
|---|---|---|---|
| 4,507,103 | 3/1985 | Mittermeier | 474/110 |
| 4,863,417 | 9/1989 | Kimata et al. | 474/138 X |
| 5,021,032 | 6/1991 | Macchiarulo et al. | 474/135 X |

Primary Examiner—Roger J. Schoeppel
Attorney, Agent, or Firm—Wenderoth, Lind & Ponack

[57] ABSTRACT

A chain tensioner keeps constant the tension of a chain for transmitting the rotation of an engine crankshaft to e.g. camshafts. It includes a housing having a cylinder chamber. A rod member has its rear end inserted in the cylinder chamber for pressing a chain. A tension adjusting spring biases the rod member outwardly of the housing. The chain tensioner further includes a hydraulic damper for damping a dynamic load applied to the rod member from the chain, and a thread engagement mechanism for preventing the rod member from retracting under a static load applied to the rod member.

19 Claims, 10 Drawing Sheets

CHAIN TENSIONER AND CHAIN SYSTEM

BACKGROUND OF THE INVENTION

This invention relates to a chain tensioner for keeping the tension in a chain such as a camshaft drive chain at a constant level, and a chain system including such a chain tensioner.

A typical chain tensioner in a camshaft drive chain system for an internal combustion engine keeps constant the tension in the chain by applying an adjusting force to a slack side of the chain.

FIG. 14 shows a conventional chain tensioner of this type. This chain tensioner includes a plunger 102 and a spring 103 mounted in a cylinder chamber 101 formed in a housing 100. The spring 103 biases the plunger 102 against a chain A.

Behind the plunger 102 is a pressure chamber 104 to which an oil feed passage 105 opens. A check valve 106 is disposed in the oil feed passage 105. When the plunger 102 moves outward so that the pressure in the pressure chamber 104 drops, the check valve 106 opens and simultaneously an oil feed pump is activated to feed oil through the oil feed passage 105 into the pressure chamber/ chamber 104.

When the tension in the chain A increases and the plunger 102 is pushed back into the housing, the oil sealed in the pressure chamber 104 serves as a damper, damping the movement of the plunger. As the chain A slackens, the spring 103 pushes out the plunger 102 quickly to increase the tension in the chain A. The plunger 102 can smoothly move in and out following the fluctuating tension in the chain, thus keeping the tension in the chain at a constant level.

In a camshaft drive chain, its tension may increase when the engine is stopped, according to the positions of the cams on the camshafts when they are stopped. The chain A thus urges the plunger 102 into the housing 100, increasing the oil pressure in the pressure chamber 104. The oil in the chamber 104 thus gradually leaks through a gap present between the plunger 102 and the inner wall of the cylinder chamber 101, allowing the plunger 102 to be pushed into the housing 100 until the pushing force from the chain A balances with the force of the spring 103.

When the engine is restarted in this state and the chain A slackens, the plunger 102 will move a long distance outwardly. Since the engine has just been started, the oil feed pump has not been sufficiently warmed up and cannot supply a sufficient amount of oil into the pressure chamber. Thus, air may find its way into the pressure chamber, impairing the damping properties of the chain tensioner.

Also, immediately after the engine has been started, the oil is high in viscosity and low in fluidity. This is also another potential cause of the above problem.

In order to solve this problem, Unexamined Japanese Utility Model Publication 64-25557 proposes to provide the housing with pivotable ratchet pawls to prevent the plunger from being pushed into the housing when the engine is cut by bringing the ratchet pawls into engagement with a rack provided on the outer periphery of the plunger. But this arrangement has the problem of durability because a load from the chain concentrates on the portion where the rack engages a ratchet pawl. Also, when the plunger moves outwardly, the ratchet pawl disengages from the rack, producing abnormal noise.

A first object of this invention is to provide a durable chain tensioner having means for preventing air from entering the pressure chamber when the fluidity of hydraulic oil is low such as when the engine is started in a cold environment.

A second object of this invention is to provide a chain system that produces less noise.

A third object of this invention is to provide a chain tensioner which is made up of a small number of parts and is thus less costly and still exhibits as high performance as a chain tensioner having a unidirectional hydraulic damper.

SUMMARY OF THE INVENTION

According to the first aspect of the present invention, there is provided a chain tensioner comprising a housing having a cylinder chamber, a rod member having a rear end thereof inserted in the cylinder chamber for pressing a chain, a tension adjusting spring biasing the rod member outwardly of the housing, a hydraulic damper for damping a dynamic load applied to the rod member from the chain, and a thread engagement means for preventing the rod member from retracting under a static load applied to the rod member.

According to the second aspect of the present invention, there is provided a chain system comprising a chain for transmitting the rotation of a crankshaft to a camshaft, a pivotable slipper kept in contact with a slackening side of the chain, and a chain tensioner according to the first invention, wherein the slipper is pressed against the slackening side of the chain by the rod member of the chain tensioner.

According to the third aspect of the present invention, there is provided a chain tensioner comprising a housing having a cylinder chamber, a rod member having a rear end thereof inserted in the cylinder chamber for pressing a chain, a pressure oil supply means biasing the rod member outwardly of the housing, and a thread engagement means for preventing the rod member from retracting under a static load applied to the rod member from the chain, the thread engagement means comprising threads in the shape of serrations, the threads having pressure flanks and clearance flanks having a smaller flank angle than the pressure flanks, the threads having such a lead that the rod can be moved outwardly under the force of the tension adjusting spring.

Other features and objects of the present invention will become apparent from the following description made with reference to the accompanying drawings, in which:

DETAILED DESCRIPTION OF THE PREFERRED EMBODIMENT (First Embodiment)

The first embodiment of this invention will now be described with reference to FIGS. 1–7.

Figure 1:
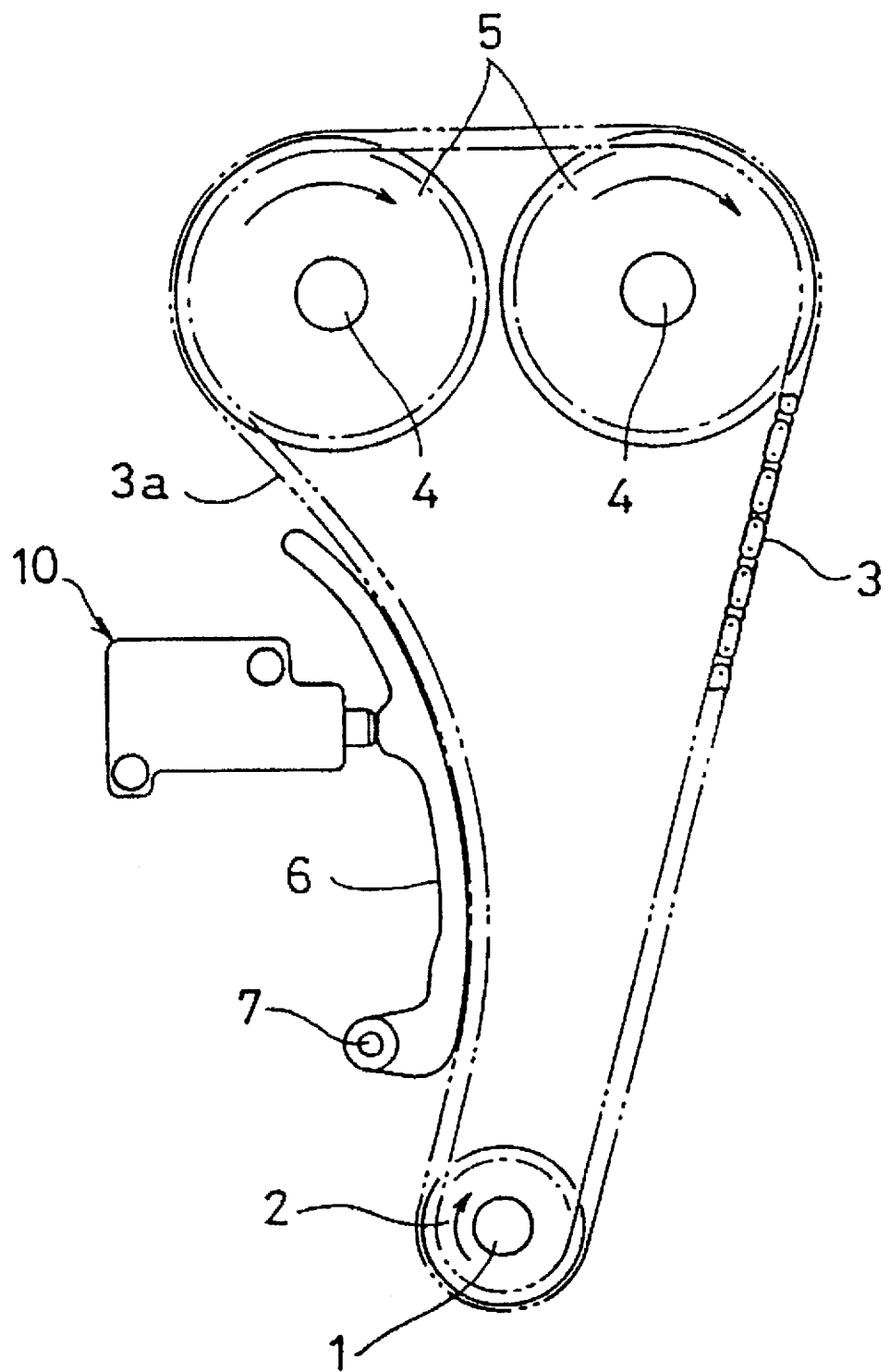
FIG. 1 is a schematic view of a chain system according this invention.

FIG. 1 shows a cam driving chain system for an internal combustion engine. The engine has a crankshaft 1 carrying a sprocket 2 at one end. The rotation of the sprocket 2 is transmitted to sprockets 5 mounted on the ends of camshafts 4 through a chain 3.

A slipper 6 is provided so as to pivot about a shaft 7. A chain tensioner 10 presses the slipper 6 against a slack side 3a of the chain 3 to apply tension to the chain 3.

Figure 2:
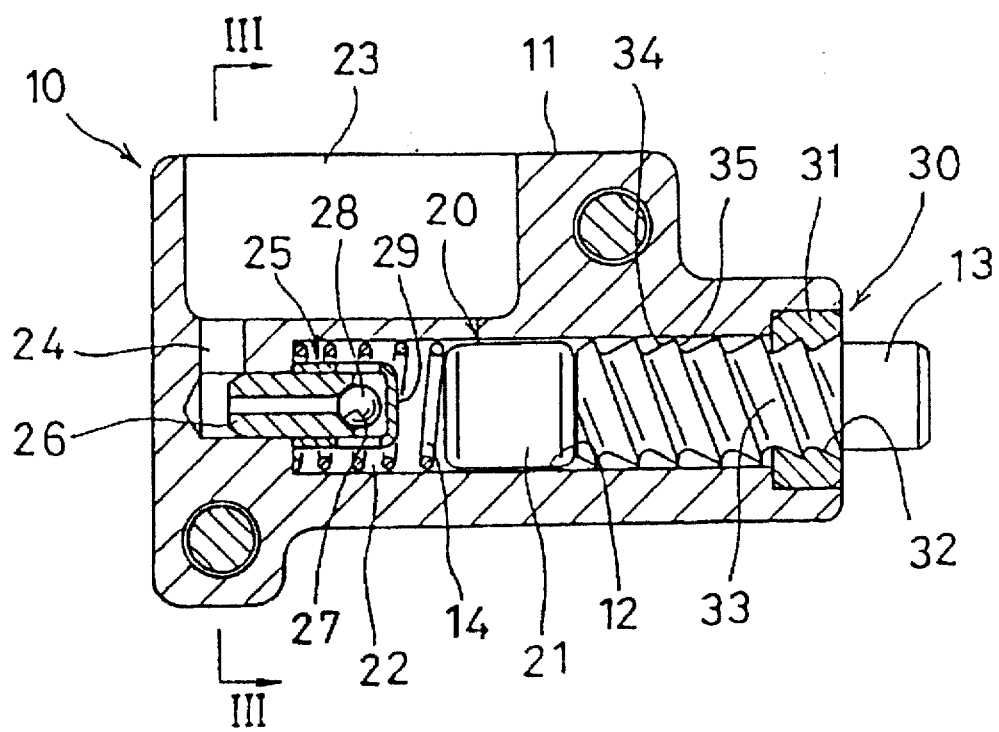
FIG. 2 a sectional view of a chain tensioner in the chain system of FIG. 1.
Figure 3:
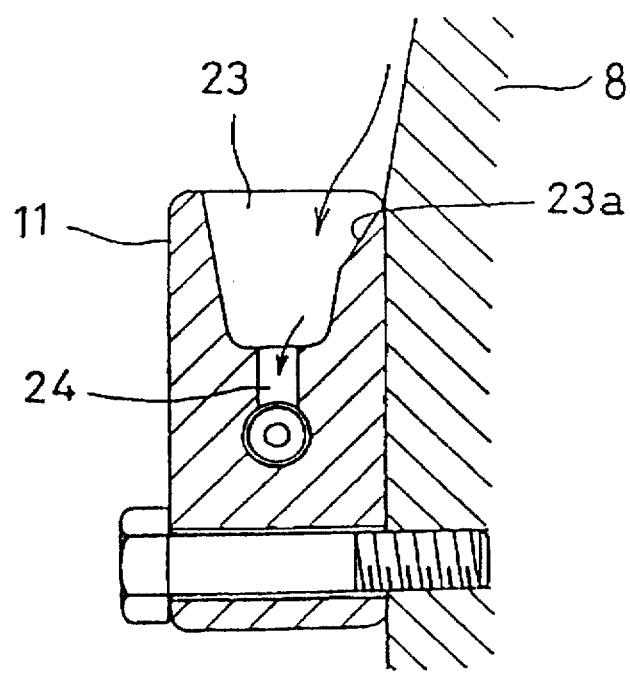
FIG. 3 is a sectional view taken along line III—III of FIG. 2.
Figure 4:
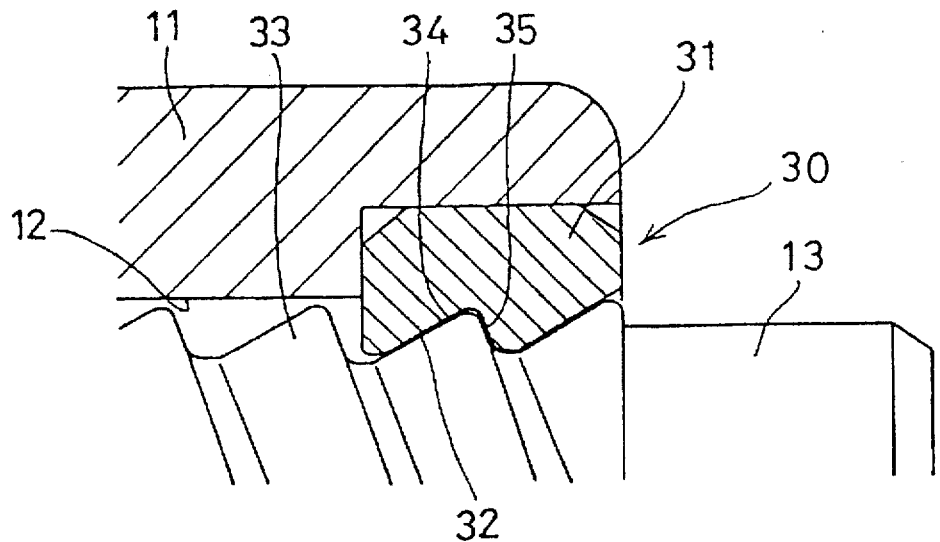
FIG. 4 is an enlarged sectional view showing the threadedly engaging thereof.

FIGS. 2–4 show the detailed structure of the chain tensioner 10. It has a housing 11 fixed to the wall of a crank chamber of a cylinder block 8. The housing 11 has a cylinder chamber 12 that opens at the end facing the slipper 6. A rod member 13 has its rear end inserted in the cylinder chamber 12.

The rod member 13 is biased outwardly by a tension adjusting spring 14 mounted in the cylinder chamber 12 and pressed against the slipper 6.

Dynamic load is applied to the rod member 13 from the chain 3 while the chain 3 is moving to transmit engine torque. When the engine is cut, the tension in the chain 3 may increase according to the positions of the cams on the cam shafts 4 when they are stopped. In such a case, static load is applied to the rod member 13 from the chain 3.

Dynamic load applied to the rod member 13 is damped by a hydraulic damper 20. Static load applied to it is borne by a thread engagement mechanism 30. That is, this mechanism 30 prevents the rod member 13 from being pushed into the housing 11 when the engine is cut.

The hydraulic damper 20 comprises a plunger 21 disposed behind the rod member 13 so as to be slidable along the inner periphery of the cylinder chamber 12. A pressure chamber 22 is defined behind the plunger 21. It communicates with a reservoir chamber 23 formed in the top surface of the housing 11 through an oil feed passage 24 formed in the housing 11 near its end. A check valve 25 is provided in the oil feed passage 24.

The check valve 25 comprises a sleeve 26 press-fitted in the outlet of the oil feed passage 24, a valve body 28 movable toward and away from a valve seat 27 formed at the end of the sleeve 26, and a retainer 29 retaining the valve body 28. The check valve 25 opens the oil feed passage 24 when the pressure in the pressure chamber 22 decreases below the pressure of pressure oil being fed into the oil feed passage 24.

Figure 6:
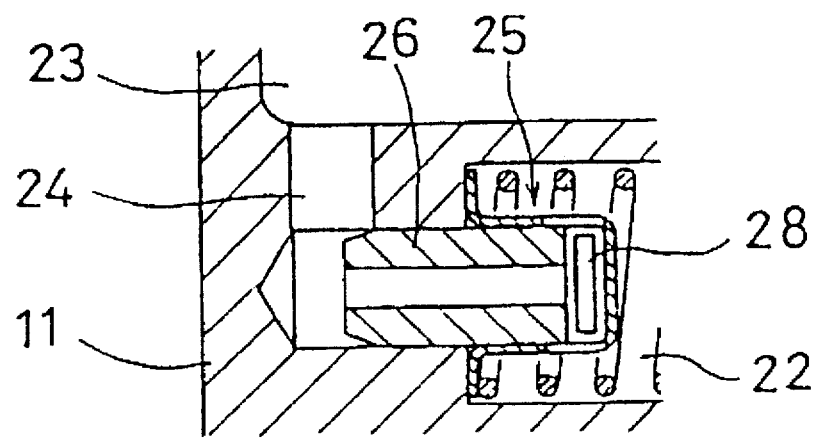
FIG. 6 is a sectional view of a different check valve.

The valve body 28 may be a ball or may be a plate as shown in FIG. 6. The valve body 28 in the form of a plate can open the outlet of the oil feed passage 24 to a greater degree than the valve body in the form of a ball, so that oil can more smoothly flow from the reservoir chamber 23 into the pressure chamber 22. It is thus possible to effectively prevent entry of air into the pressure chamber 22.

Lubricating oil splashed by the rotating engine crankshaft is supplied into the reservoir chamber 23. But instead, pressure oil discharged from an engine-driven hydraulic oil may be supplied into the oil feed passage 24.

The thread engagement mechanism 30 comprises a nut member 31 mounted in the cylinder chamber 12 near its opening and having a threaded hole 32, and a threaded portion 33 formed around the rod member 13 and threadedly engaged in the threaded hole 32.

The threads on the threaded hole 32 and the threaded portion 33 have a serration-like section, with pressure flanks 34 for bearing static pressure applied to the rod member 13 having a greater flank angle than clearance flanks 35. The flank angles and the lead angle of the threads are determined so that the mechanism 30 permits smooth outward movement of the rod member 13 under the force of the tension adjusting spring 14 but does not allow the movement of the rod member 13 in the retracting direction. The mechanism 30 checks the latter movement under static load. But when dynamic load is applied to the rod member, the rod member 13 can gradually retract axially while rotating in the threaded hole 32 until the dynamic load applied to the rod member 13 balances with the force of the tension adjusting spring 14.

Referring to FIG. 1, the tension in the chain 3 fluctuates as the torque does while it is transmitting the rotation of the crankshaft 1 to the camshafts 4. When the tension in the slack side 3a of the chain 3 decreases, the rod member 13 of the chain tensioner shown in FIG. 2 protrudes outward biased by the tension adjusting spring 14. Since the flank angle and lead angle of the clearance flanks 35 are determined such that the mechanism 30 allows movement of the rod member 13 in the protruding direction, the rod member can quickly protrude outwardly while rotating in the threaded hole 32 to press the slipper 6 against the chain. Slackness of the chain 3 thus is absorbed instantly. When the force applied to the rod member 13 from the chain 3 balances with the force of the tension adjusting spring 14, the rod member 13 will stop.

While the rod member 13 is moving outwardly, the plunger 21 also moves outwardly together with the rod member 13. The pressure in the pressure chamber 22 thus drops. This opens the check valve 25 and oil flows from the reservoir chamber 23 into the pressure chamber 22.

As a result, the amount of oil in the reservoir chamber 23 will temporarily decrease. But oil splashed by the rotating crankshaft 1 flows along the inner surface of the cylinder block 8 and is continuously supplied into the reservoir chamber 23 as shown by the arrows in FIG. 3.

In order to guide oil that flows along the inner surface of the cylinder block 8 into the reservoir chamber 23, a tapered guide surface 23a is formed at the top opening of the reservoir chamber 23. While oil is flowing along the guide surface 23a, air in the oil is spontaneously removed. This prevents the entry of air into the reservoir chamber 23.

When the tension in the slack side 3a of the chain 3 increases due to torque fluctuation, a pushing force is applied from the slack side 3a of the chain to the rod member 13 through the slipper 6. Since this pushing force is a dynamic load, the nut member 31 allows smooth rotation of the threaded portion 33 of the rod member 13 in the threaded hole 32. Thus, the pushing force applied to the rod member 13 is transmitted to the plunger 21.

This increases the pressure in the pressure chamber 22. The oil passage 24 is thus closed by the check valve 25, so that the pushing force is damped by the oil sealed in the pressure chamber 22.

While the pushing force is greater than the force of the tension adjusting spring 14, oil in the pressure chamber 22 flows through a gap between the inner wall of the cylinder chamber 12 and the plunger 21 into the front portion of the cylinder chamber 12, allowing the rod member 13 and the plunger 21 to retract until the pushing force balances with the force of the tension adjusting spring 14.

When the engine is cut, the tension in the slack side 3a of the chain may increase according to the positions of the cams on the camshafts 4 when they stop. In such a case, a pushing force resulting from the increased belt tension will be applied to the rod member 13. This force, which is a static load, is borne by the pressure flanks 34 at their portions in threaded engagement with the threaded portion 33 of the rod member 13. In this state, the rod member 13 will not retract because the flank angle and lead angle of the pressure flanks 34 are determined such that the mechanism 30 checks the retracting movement of the rod member under static pushing force.

Thus, when the engine is restarted, the slack side 3a of the chain 3 will not slacken so markedly. The rod member 13 is thus held within a normal movement range, so that the pressure in the pressure chamber 22 drops little. This prevents the entry of air into the pressure chamber 22.

Since oil viscosity is high immediately after the engine is started in a cold environment, oil will not flow smoothly into the pressure chamber 12. But because the rod member 13 protrudes little, no air will enter the pressure chamber 22.

Figure 5:
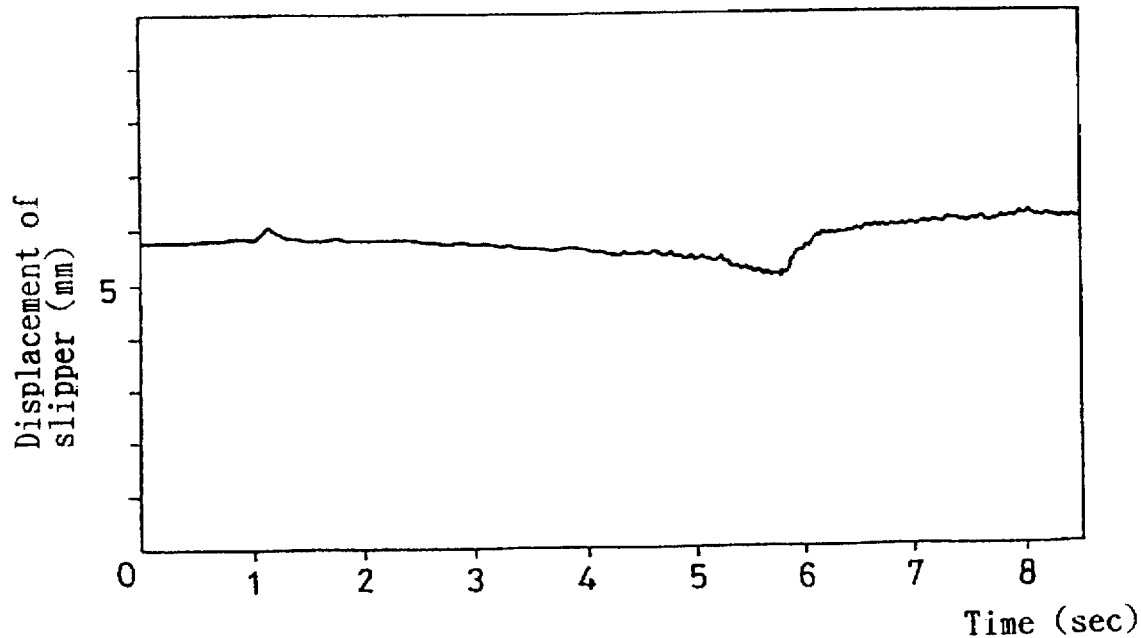
FIG. 5 is a graph showing the displacement of the slipper when engine is started.

The displacement of the slipper 6 was measured when the engine was started. The results are shown in FIG. 5. As shown in this graph, the slipper 6 and the chain 3 moved little and produced little noise Since the tension in the chain is kept substantially constant at all times irrespective of whether the engine is running or not, the chain 3 is less likely to be stretched.

Figure 7:
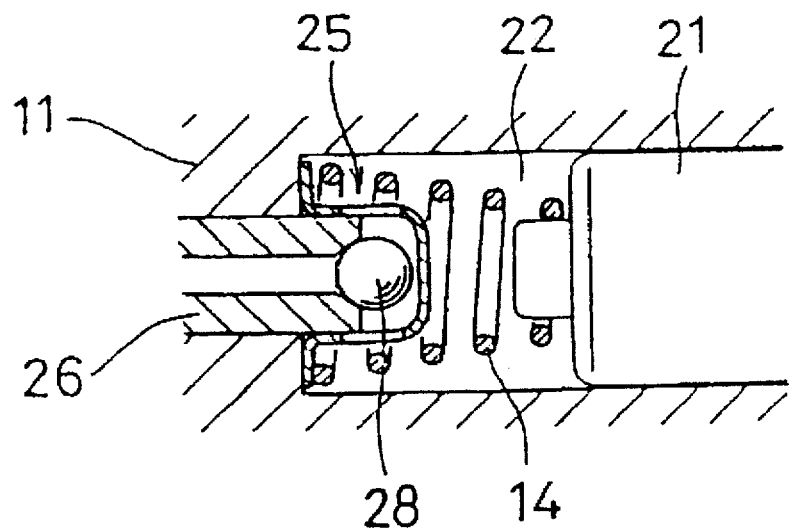
FIG. 7 is a sectional view of a different tension adjusting spring.

As shown in FIG. 7, a tapered coil spring may be used as the tension adjusting spring 14. In this arrangement, even if air should enter the pressure chamber 22, such air will not stay in the chamber but will be guided smoothly along the tapered spring and discharged through the gap between the plunger 21 and the inner wall of the cylinder chamber 12 when the plunger 21 retracts.

(Second Embodiment)

Figure 8:
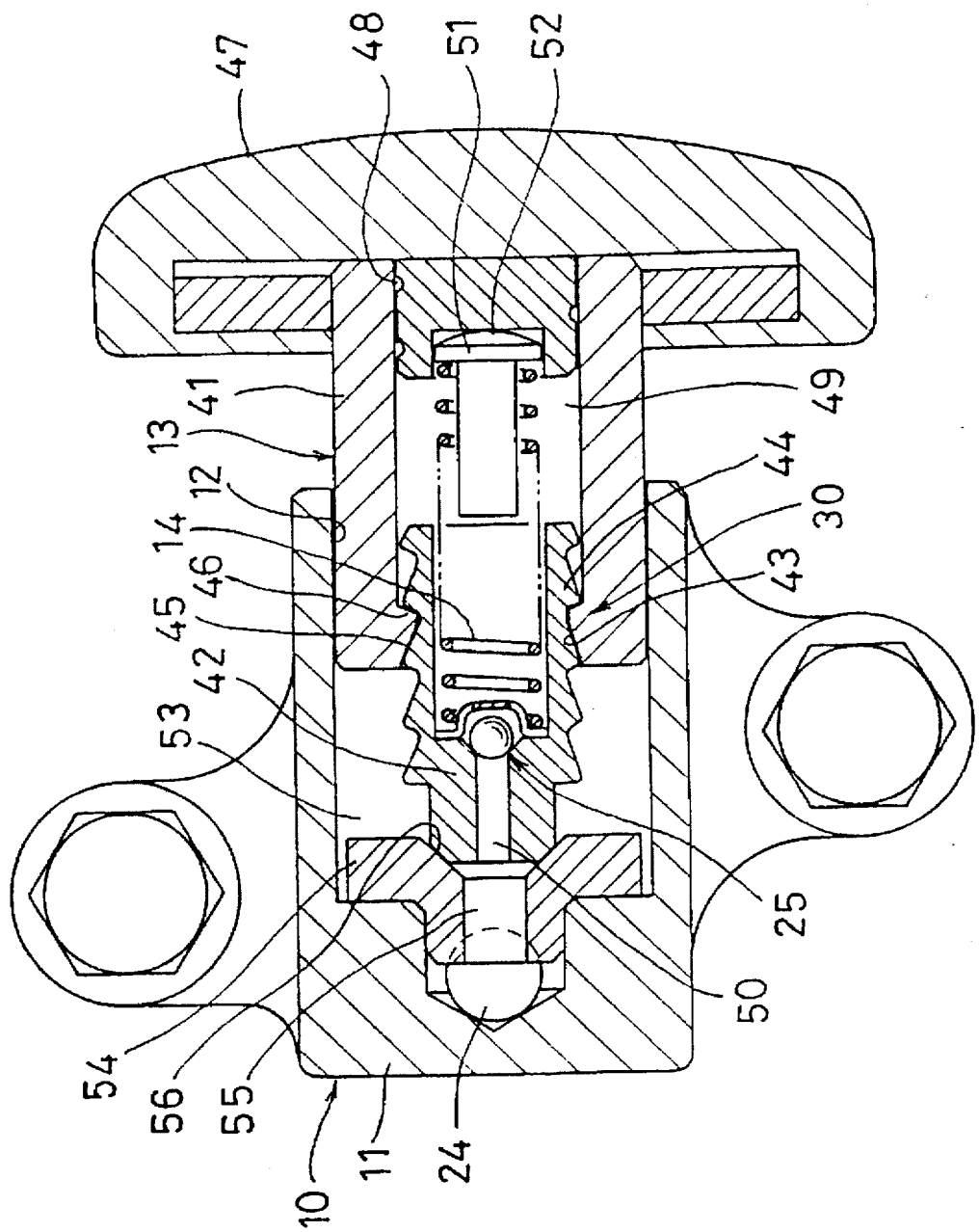
FIG. 8 is a sectional view of a second embodiment of the chain tensioner according to this invention.

FIG. 8 shows the second embodiment of the chain tensioner according to this invention. In this embodiment, a rod member 13 inserted in the cylinder chamber 12 of the housing 11 is comprised of a first rod 41 and a second rod 42.

The first rod 41 is a cylindrical member having a rear open end. The second rod 42 is inserted in the first rod 41 and coupled thereto by a thread engagement mechanism 30. The mechanism 30 comprises female threads 43 formed on the inner periphery of the first rod 41, and male threads 44 formed on the outer periphery of the second rod 42. Like the thread engagement mechanism 30 shown in FIG. 4, the threads 43 and 44 have a serration-like section with the pressure flanks 45 having a greater flank angle than the clearance flanks 46.

A slipper 47 for pressing the chain 3 is press-fitted on the end of the first rod 41. An orifice 48 is formed at a connection between the slipper 47 and the first rod 41. A first pressure chamber 49 formed in the first rod 41 communicates through the orifice 48 with the outside.

The second rod 42 has a stepped passage 50 extending axially therethrough. A check valve 25 is provided in the passage 50 to open it when the oil pressure in the first pressure chamber 49 is lower than the pressure of pressure oil being fed into the oil feed passage 24. A tension adjusting spring 14 is mounted between the first rod 41 and the second rod 42. A spring seat 51 is mounted on the end of the tension adjusting spring 14. The spring seat 51 is formed with a spherical surface 52 at its front side which is pressed into point-contact with the closed end of the first pressure chamber 49. The point-contact feature allows smooth relative rotation of the first rod 41 and the second rod 42.

The first rod 41 of the rod member 13 has its rear end slidably inserted in the cylinder chamber 12, thereby defining a second pressure chamber 53 behind the first rod 41. Thus, the first rod 41 also functions as the plunger of the hydraulic damper.

A rod seat 54 is mounted on the closed end of the cylinder chamber 12 of the housing 11. The rod seat 54 has a passage 55 communicating with the oil passage 24. The rear end of the second rod 42 can be moved into contact with a conical seat surface 56 formed at the outlet of the passage 55.

Like the tensioner of FIG. 1, this tensioner is mounted such that the slipper 47 presses the slack side 3a of the chain. When, in this state, the engine is started and the slipper 47 is pressed by the chain 3 due to torque fluctuation of the chain, the oil sealed in the first pressure chamber 49 and the second pressure chamber 53 is compressed, thus damping the pressing force.

While the pressing force is greater than the force of the tension adjusting spring 14, the first rod 41 keeps retracting to a position where the force of the tension adjusting spring 14 balances with the pressing force.

While the first rod is retracting, the second rod 42 rotates while kept in contact with the seat surface 56 of the rod seat 54, with the oil in the first pressure chamber 49 leaking out through the orifice 48 and the oil in the second pressure chamber 53 leaking out through a gap between the first rod 41 and the housing 11.

When the slack side 3a of the chain slackens, the first rod 41 advances biased by the tension adjusting spring 14. Since the flank angle and the lead of the clearance flanks 46 are determined so that the mechanism 30 permits smooth movement of the first rod 41 in the protruding direction, the first rod protrudes quickly, absorbing slack of the slack side 3a of the chain.

If the slack side 3a of the chain slackens markedly, the entire rod member 13 protrudes outwardly under the pressure of pressure oil being supplied into the oil passage 24. When the slipper 47 abuts the slack side 3a of the chain and the rod member 13 stops, the second rod 42 begins to retract while rotating under the force of the tension adjusting spring 14 until it abuts the seating surface 56 of the rod seat 54.

While the first rod 41 is moving relative to the second rod 42, or the second rod 42 is moving relative to the first rod 41, the pressure in the first pressure chamber 49 drops, so that the check valve 25 opens, letting the oil in the oil feed passage 24 flow through the passage 50 into the first pressure chamber 49.

If the cams on the camshafts 4 stop at such position as to increase the tension in the slack side 3a of the chain when the engine is cut, the first rod 41 will be urged axially by the chain. But the flank angle and the lead of the pressure flanks 45 are determined such that the mechanism 30 checks the retraction of the first rod 41 under static load. Since the first rod 41 is kept from retracting, the slack side 3a of the chain remains stretched.

Thus, it is possible to prevent slackening of the slack side 3a of the chain when the engine is restarted and thus to prevent pressure drop in the first pressure chamber 49 and entry of air into the first chamber 49.

(Third Embodiment)

Figure 9:
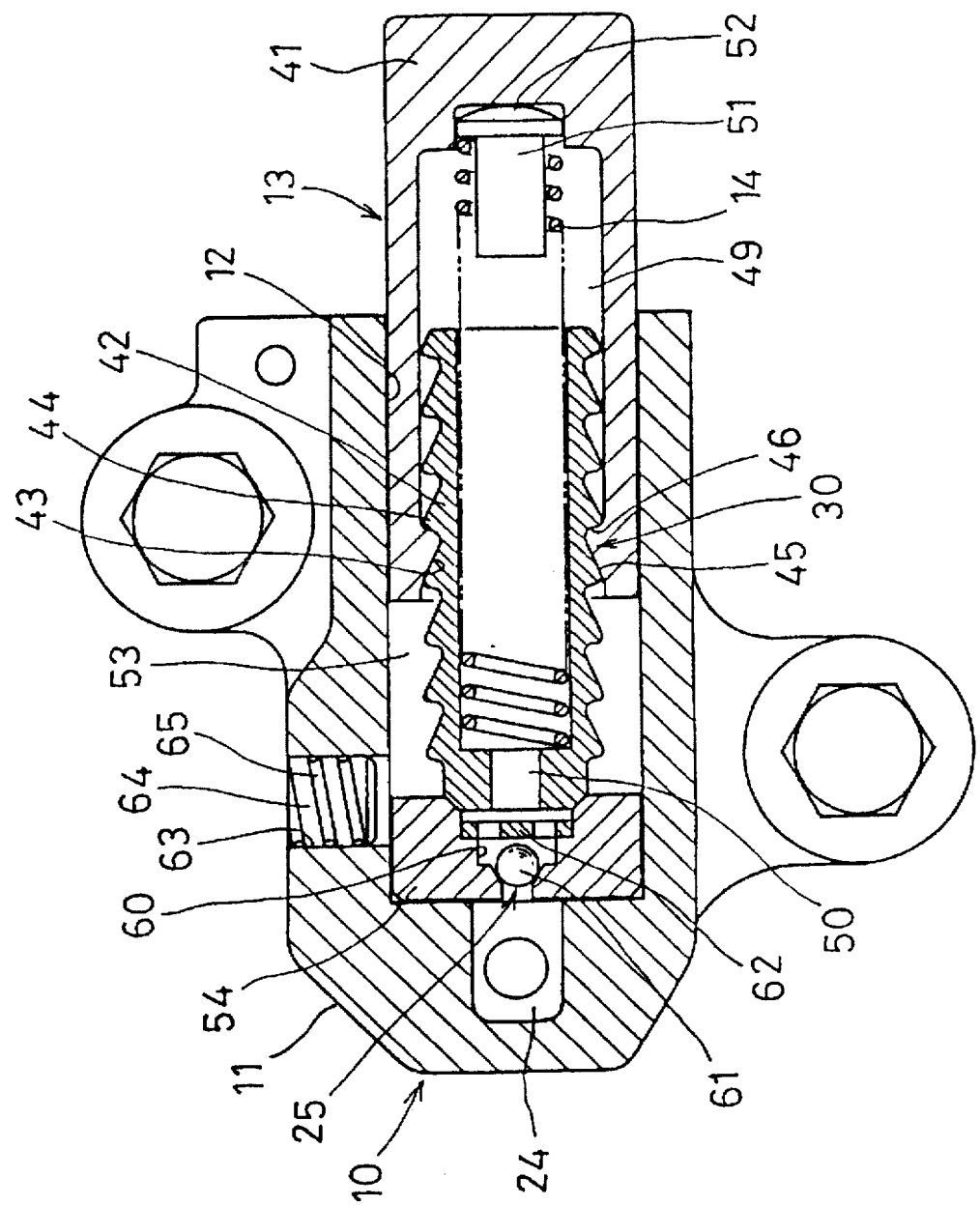
FIG. 9 is a sectional view of a third embodiment of the chain tensioner.

FIG. 9 shows the third embodiment of the chain tensioner according to this invention. It has no slipper 47 as used in the second embodiment.

A check valve 25 is mounted in a stepped passage 60 formed in the rod seat 54. The check valve 25 comprises a ball 61 mounted in the stepped passage 60, and a retainer plate 62 having holes and being press-fitted in the passage 60 at its outlet. The retainer plate 62 limits the movement of the ball 61 and thus the degree of opening of the passage 60.

The housing 11 has a hole 63 extending through its peripheral wall and opening to the second pressure chamber 53. A plug 64 is press-fitted in the hole 63. A helical orifice 65 is formed in the outer periphery of the plug 64.

For other structures and operation, this embodiment is the same as the second embodiment. Like elements are denoted by like numerals and their description as well as a description of the operation are omitted.

In the third embodiment, the second pressure chamber 53 opens to the outside through the orifice 65 formed in the housing 11. Thus, any air bubbles in the oil in the second pressure chamber 53 can be smoothly expelled through the orifice 65 when the first rod 41 retracts, so that the second pressure chamber 53 can maintain high damping properties.

Figure 10:
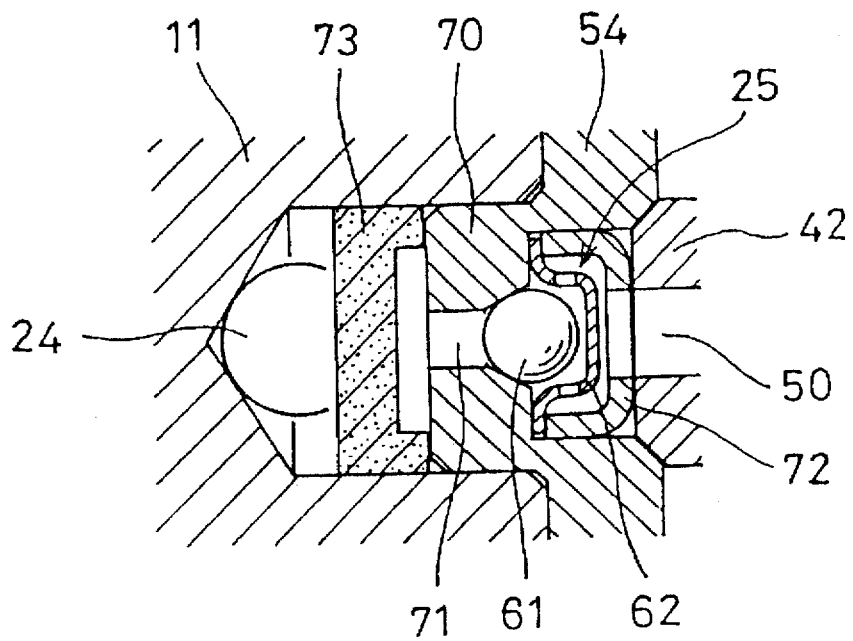
FIG. 10 is a sectional view of a rod seat of a different type from the one shown in FIG. 9.

FIG. 10 shows a different type of rod seat from the rod seat 54 used in the chain tensioner shown in FIG. 9. This rod seat 54 has a protrusion 70 inserted in the oil outlet of the oil feed passage 24. A stepped passage 71 is formed coaxially in the protrusion 70. A check valve 25 comprising a ball 61 and a retainer 62 is mounted in the large-diameter portion of the passage 71. A press ring 72 is press-fitted in the large-diameter portion to prevent the check valve 25 from coming out of the passage.

The protrusion 70 makes it possible to use a thinner rod seat than the rod seat 54 shown in FIG. 9 and thus to reduce the size of the chain tensioner.

In the arrangement of FIG. 10, a filter 73 is provided in the oil passage 24. It removes any foreign matter contained in oil fed through the oil passage 24 to prevent various trouble resulting from foreign matter such as deteriorated sealing properties of the check valve 25 and abnormal wear of the sliding surfaces of the housing 11 and the first rod 41.

(Fourth Embodiment)

Figure 11:
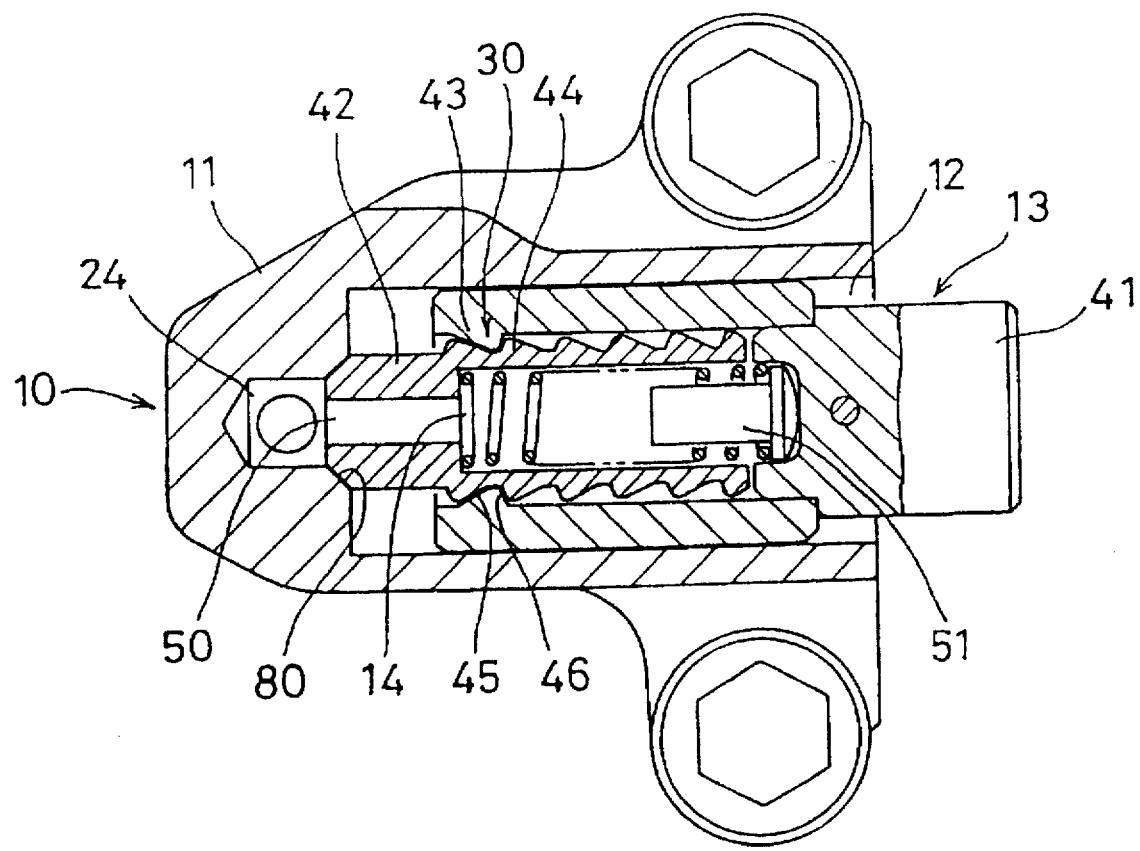
FIG. 11 is a sectional view of a fourth embodiment of the chain tensioner.

FIG. 11 shows the fourth embodiment of the chain tensioner according to this invention. The chain tensioner of this embodiment has no rod seat 54 as used in the third embodiment. The second rod 42 has its rear end in abutment with a seating surface 80 formed at the outlet of the oil feed passage 24. Pressure oil supplied from an unillustrated pump through the oil feed passage 24 pushes the rod member 13 outwardly.

Otherwise, this embodiment is the same as the third embodiment. Like elements are denoted by like numerals and their description is omitted.

In this embodiment, when the tension in the slack side 3a of the chain 3 shown in FIG. 1 increases due to torque fluctuation and the first rod 41 is pushed in under the pushing force applied to it through the slipper 6, the rod pushing force is borne by the pressure flanks 45 of the male threads 44 and female threads 43 at their engaging portions. The first rod 41 thus retracts slowly until the force of the tension adjusting spring 14 balances with the rod pushing force.

When the slack side 3a of the chain 3 slackens, the rod member 13 moves quickly outwardly under the pressure of pressure oil supplied into the oil feed passage 24. At the same time, the second rod 42 retracts while rotating under the force of the tension adjusting spring 14 until it abuts the seating surface 80. Thus, any slack of the slack side 3a of the chain is absorbed quickly.

The first rod 41 slowly retracts when the tension in the slack side 3a of the chain is increasing and protrudes quickly when the chain slackens, thereby providing good follow-up to fluctuations in the belt tension in an ideal manner. This chain tensioner, having no check valve, is made up of a smaller number of parts and is thus inexpensive. Still, its performance is as high as a chain tensioner having a unidirectional hydraulic damper with a check valve.

(Fifth Embodiment)

Figure 12:
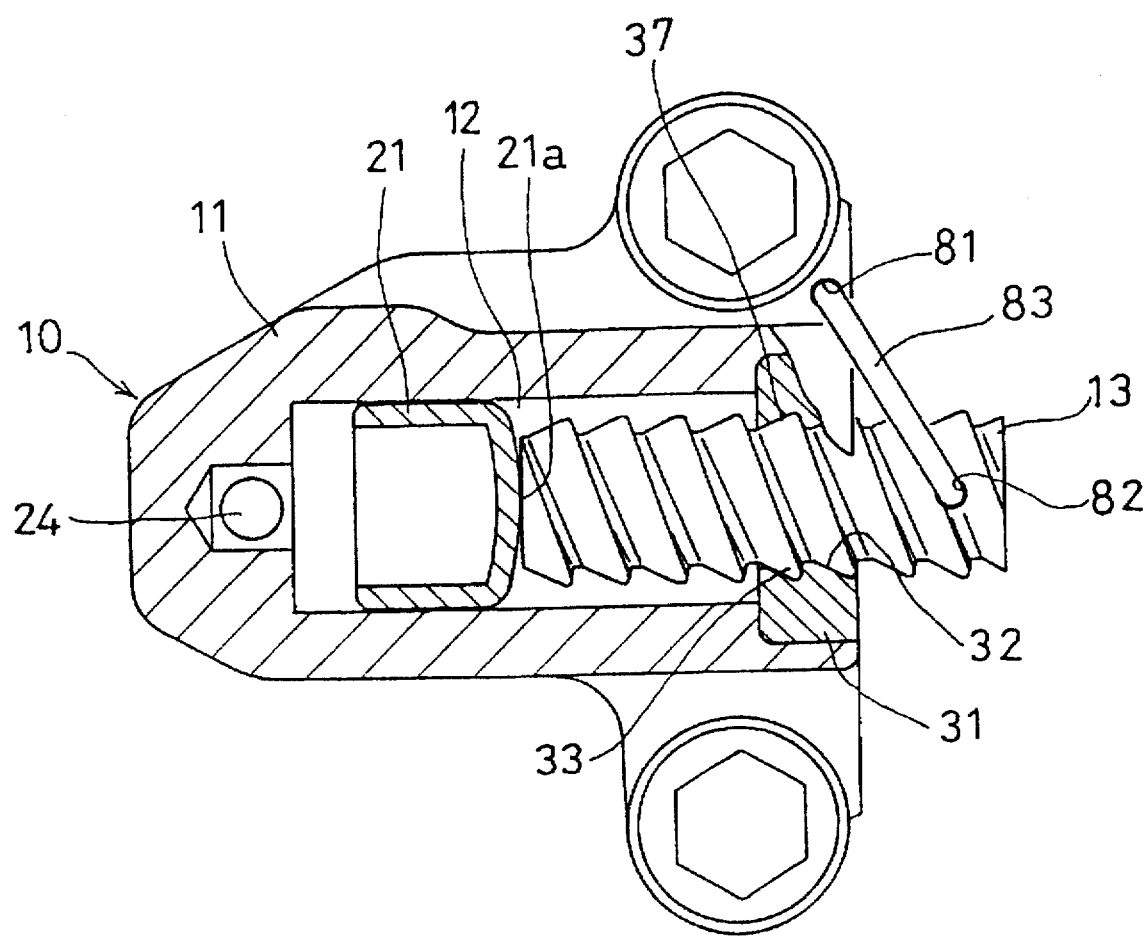
FIG. 12 is a sectional view of a fifth embodiment of the chain tensioner.

FIG. 12 shows the fifth embodiment of the chain tensioner according to this invention. It has none of the tension adjusting spring 14, check valve 25 and reservoir chamber 23 as used in the embodiment of FIG. 2. The plunger 21 has at its end a spherical surface 21a which is in point-contact with the rear end of the rod member 13.

A set pin 83 is inserted in a pin hole 81 formed in the housing 11 and a pin hole 82 formed in the rod member 13 near its end to prevent the rod member 13 from coming out of the housing.

With the housing 11 mounted in position, this set pin 83 is pulled out and pressure oil discharged from the hydraulic pump is fed into the oil feed passage 24 to move the rod member 13 outwardly and press it against the slack side of the chain through the slipper 6 shown in FIG. 1.

The pushing force applied to the rod member 13 from the chain 3 through the slipper 6 is borne by the pressure flanks 34 of the threads on the threaded hole 32 in the nut member 31 and the threaded portion 33 on the rod member 13. The rod member 13 thus retracts slowly.

When the slack side 3a of the chain slackens, the rod member 13 quickly protrudes while rotating under the pressure of pressure oil supplied into the cylinder chamber 12 through the oil feed passage 24, thus quickly absorbing slack of the slack side 3a of the chain.

The chain tensioner of the fifth embodiment offers the same advantages as the chain tensioner of the fourth embodiment.

(Sixth Embodiment)

Figure 13A:
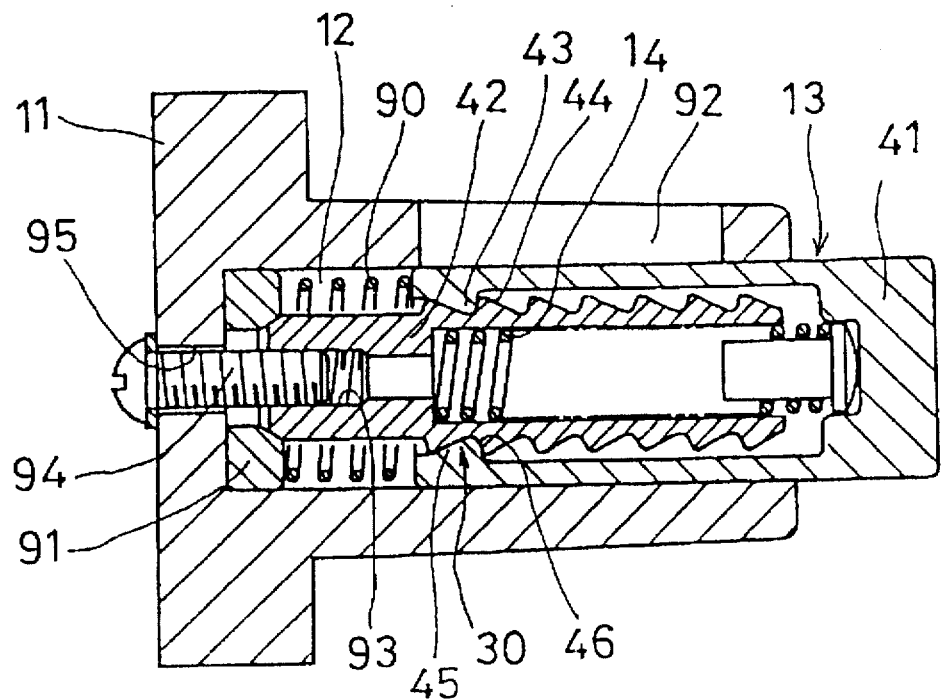
FIG. 13A is a sectional view of a sixth embodiment of the chain tensioner.

FIG. 13A shows the sixth embodiment of the chain tensioner according to this invention. In this embodiment, the same rod member 13 shown in FIG. 9 is inserted in the cylinder chamber 12 formed in the housing 11. The first rod 41 of the rod member 13 is biased outwardly by a second tension adjusting spring 90. The second rod 42 has its rear end supported on a rod seat 91 fitted in the closed end of the cylinder chamber 12.

The housing 11 has an oil inlet 92 in its upper portion. Oil is supplied into the cylinder chamber 12 through the inlet 92 to lubricate a thread engagement mechanism 30 provided between the first rod 41 and the second rod 42.

The second rod 42 is formed with female threads 93 at its rear end. A screw 94 is inserted through a threaded hole 95 formed in the rear end of the housing 11 into threaded engagement with the female threads 93 and tightened to keep the rod member 13 from coming out of the housing.

With the housing 11 mounted in position, the screw 94 is removed to cause the first rod 41 to protrude outwardly under the force of the second tension adjusting spring 90 and press it against the slack side 3a of the chain 3 through the slipper 6 shown in FIG. 1.

Figure 13B:
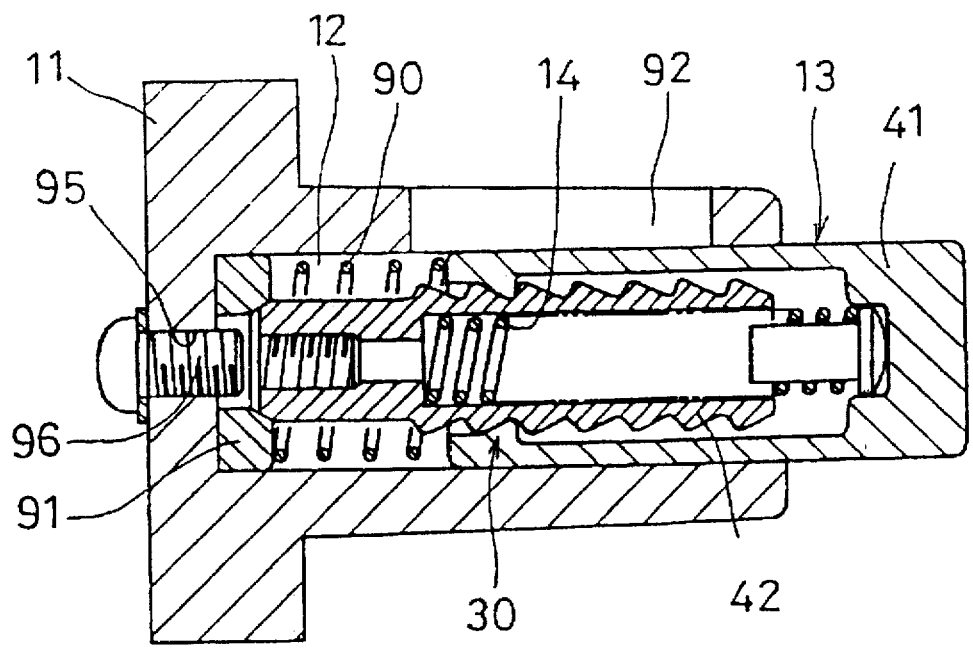
FIG. 13B is a sectional view of FIG. 13A in an operational state.
Figure 14:
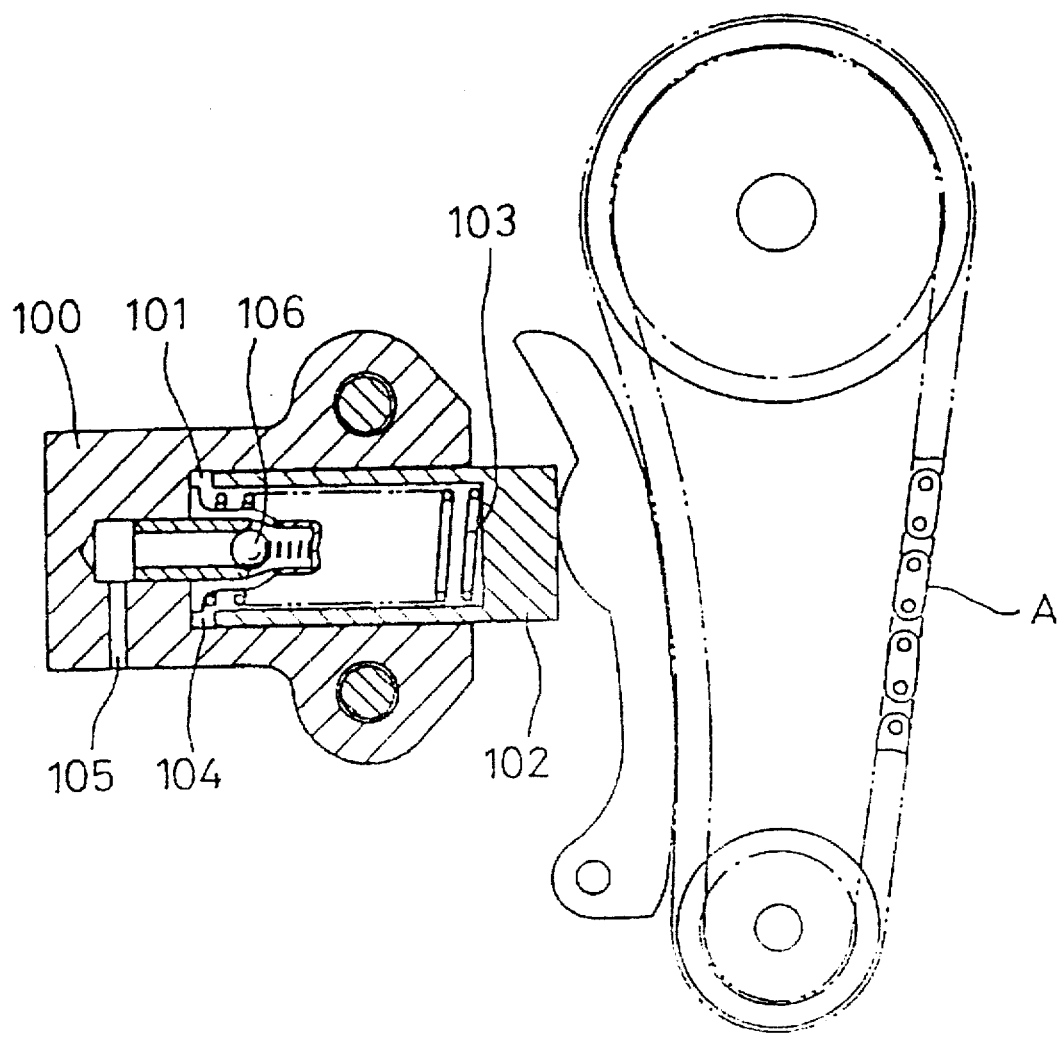
FIG. 14 is a sectional view of a conventional chain tensioner.

After removing the screw 94, as shown in FIG. 13B, a plugging screw 96 is inserted into the threaded hole 95 formed in the rear end of the housing 11 to close the threaded hole 95.

In the six embodiment, the rod member 13 is biased outwardly by the tension adjusting spring 14 mounted in the first rod 41 and the second tension adjusting spring 90. In this arrangement, it is possible to omit the oil feed passage 24 and the oil pump used in the chain tensioner of the fourth embodiment shown in FIG. 4. The chain tensioner of this embodiment is thus simple in structure.

It is possible to prevent separation of the housing 11 and the rod member 13 during transportation. The chain tensioner can be mounted easily on a cylinder block.

The following are advantages of the chain tensioner according to this invention.

According to one aspect of the present invention, the rod member is biased outwardly by the tension adjusting spring. Dynamic load applied to the rod member is borne by the hydraulic damper. The rod can thus move smoothly in response to fluctuations in tension in the chain, thereby keeping the tension in the chain at a constant level.

Static load applied to the rod member is borne by the thread engagement means. Even if the tension in the chain increases depending upon the positions of the cams when the engine is cut, the thread engagement means checks the retraction of the rod member, thus keeping the chain stretched. When the engine is restarted or while the engine is running in a cold environment, the chain will not slacken markedly, so that the rod protrudes only slightly. This prevents the entry of air into the pressure chamber.

It is also possible to prevent violent movements of the chain and the slipper and the resulting noise when the engine is started.

The chain tensioner according to another aspect of the invention has a thread engagement means comprising serration-like threads formed on the rod member being biased outwardly by pressure oil. This rod member can more smoothly move following fluctuations in tension in the chain. Although this chain tensioner is made up of a smaller number of parts, its performance is as high as a chain tensioner having a unidirectional hydraulic damper.

According to a further aspect of the invention, a load applied to the rod member in the direction to retract the rod member is borne by the thread engagement means. The tension adjusting spring biases the rod member in the protruding direction. In this arrangement, no pressure oil feed means is necessary, so that the entire structure is simple.

What is claimed is:

1. A chain tensioner comprising a housing having a cylinder chamber, a rod member having a rear end thereof inserted in said cylinder chamber for pressing a chain, a tension adjusting spring biasing said rod member outwardly of said housing, a hydraulic damper for damping a dynamic load applied to said rod member from the chain, and a thread engagement means for preventing said rod member from retracting under a static load applied to said rod member.

2. A chain tensioner as claimed in claim 1 wherein said hydraulic damper comprises a plunger slidably mounted in said cylinder chamber behind said rod member, a pressure chamber defined behind said plunger, an oil feed passage formed in said housing and communicating with said pressure chamber, and a check valve provided in said oil feed passage for opening said oil passage when the pressure in said pressure chamber is lower than the pressure of pressure oil supplied into said oil feed passage.

3. A chain tensioner as claimed in claim 2 wherein said thread engagement means comprises a threaded hole formed in an opening of said cylinder chamber, a threaded portion formed on the outer periphery of said rod member for threaded engagement with said threaded hole, said threaded hole and said threaded portion having threads in the shape of serrations comprising pressure flanks and clearance flanks, said pressure flanks having a greater flank angle than said clearance flanks, said threads on said threaded hole and said threaded portion having such a lead that said rod member can be moved outwardly under the force of said tension adjusting spring.

4. A chain system comprising a chain for transmitting the rotation of a crankshaft to a camshaft, a slipper pivotally supported and kept in contact with a slack side of said chain, and a chain tensioner as claimed in claim 2, wherein said slipper is pressed against said slack side of the chain by said rod member of said chain tensioner.

5. A chain tensioner as claimed in claim 2 wherein said housing has at its top an open-topped reservoir chamber communicating with said oil feed passage.

6. A chain tensioner as claimed in claim 5 wherein said thread engagement means comprises a threaded hole formed in an opening of said cylinder chamber, a threaded portion formed on the outer periphery of said rod member for threaded engagement with said threaded hole, said threaded hole and said threaded portion having threads in the shape of serrations comprising pressure flanks and clearance flanks, said pressure flanks having a greater flank angle than said clearance flanks, said threads on said threaded hole and said threaded portion having such a lead that said rod member can be moved outwardly under the force of said tension adjusting spring.

7. A chain system comprising a chain for transmitting the rotation of a crankshaft to a camshaft, a slipper pivotally supported and kept in contact with a slack side of said chain, and a chain tensioner as claimed in claim 5, wherein said slipper is pressed against said slack side of the chain by said rod member of said chain tensioner.

8. A chain tensioner as claimed claim 1 wherein said thread engagement means comprises a threaded hole formed in an opening of said cylinder chamber, a threaded portion formed on the outer periphery of said rod member for threaded engagement with said threaded hole, said threaded hole and said threaded portion having threads in the shape of serrations comprising pressure flanks and clearance flanks, said pressure flanks having a greater flank angle than said clearance flanks, said threads on said threaded hole and said threaded portion having such a lead that said rod member can be moved outwardly under the force of said tension adjusting spring.

9. A chain system comprising a chain for transmitting the rotation of a crankshaft to a camshaft, a slipper pivotally supported and kept in contact with a slack side of said chain, and a chain tensioner as claimed in claim 8, wherein said slipper is pressed against said slack side of the chain by said rod member of said chain tensioner.

10. A chain tensioner as claimed in claim 1 wherein said rod member comprises a cylindrical first rod functioning as a plunger of said hydraulic damper, and a second rod having a front end thereof slidably inserted in said first rod, said tension adjusting spring being mounted between said first rod and said second rod, said thread engagement means being provided at portions of said first and second rods where said second rod is inserted in said first rod.

11. A chain system comprising a chain for transmitting the rotation of a crankshaft to a camshaft, a slipper pivotally supported and kept in contact with a slack side of said chain, and a chain tensioner as claimed in claim 10, wherein said slipper is pressed against said slack side-of the chain by said rod member of said chain tensioner.

12. A chain system comprising a chain for transmitting the rotation of a crankshaft to a camshaft, a slipper pivotally supported and kept in contact with a slack side of said chain, and a chain tensioner as claimed in claim 1, wherein said slipper is pressed against said slack side of the chain by said rod member of said chain tensioner.

13. A chain tensioner comprising a housing having a cylinder chamber, a rod member having a rear end thereof slidably inserted in said cylinder chamber for pressing a chain, an oil supply means for supplying oil into the housing, and a thread engagement means for preventing said rod member from retracting under a static load applied to said rod member from the chain, said thread engagement means comprising threads in the shape of serrations, said threads having pressure flanks and clearance flanks, said pressure flanks having a greater flank angle than said clearance flanks, said threads having such a lead that said rod member can be moved outwardly under the force of said tension adjusting spring.

14. A chain tensioner as claimed in claim 13 wherein said rod member comprises a cylindrical first rod having its rear end slidably inserted in said cylinder chamber, and a second rod having a front end thereof slidably inserted in said first rod, said tension adjusting spring being mounted in said first rod, said thread engagement means being provided at portions where said second rod is inserted in said first rod.

15. A chain system comprising a chain for transmitting the rotation of a crankshaft to a camshaft, a slipper pivotally supported and kept in contact with a slack side of said chain, and a chain tensioner as claimed in claim 14, wherein said slipper is pressed against said slack side of the chain by said rod member of said chain tensioner.

16. A chain system comprising a chain for transmitting the rotation of a crankshaft to a camshaft, a slipper pivotally supported and kept in contact with a slack side of said chain, and a chain tensioner as claimed in claim 14, wherein said slipper is pressed against said slack side of the chain by said rod member of said chain tensioner.-.

17. A chain tensioner as claimed in claim 13 wherein said thread engagement means is formed between the outer periphery of said rod member and the inner periphery of an opening of said cylinder chamber.

18. A chain system comprising a chain for transmitting the rotation of a crankshaft to a camshaft, a slipper pivotally supported and kept in contact with a slack side of said chain, and a chain tensioner as claimed in claim 13, wherein said slipper is pressed against said slack side of the chain by said rod member of said chain tensioner.

19. A chain tensioner comprising a housing having a cylinder chamber, a rod member having a rear end thereof slidably inserted in said cylinder chamber for pressing a chain, a tension adjusting spring biasing said rod member outwardly of said housing, and a thread engagement means for preventing said rod member from retracting under a load applied to said rod member from the chain in such a direction as to retract said rod member, said housing being formed with an oil feed port through which lubricating oil is supplied to threadedly engaging surfaces of said thread engagement means.

* * * * *